United States Patent [19]

Kahn et al.

[11] Patent Number: 5,085,506

[45] Date of Patent: * Feb. 4, 1992

[54] APPARATUS AND METHOD OF FORMING AND PROJECTING HIGH PRECISION OPTICAL IMAGES

[75] Inventors: Frederic J. Kahn, Palo Alto; Paul N. Kendrick, Sunnyvale; Jerry Leff, Saratoga; Linden J. Livoni, Los Gatos; Bryan E. Loucks, Los Altos Hills; David E. Stepner, Cupertino; Kenneth G. Witte, San Jose, all of Calif.

[73] Assignee: Greyhawk Systems, Inc., Milpitas, Calif.

[*] Notice: The portion of the term of this patent subsequent to Nov. 13, 2007 has been disclaimed.

[21] Appl. No.: 610,281

[22] Filed: Nov. 6, 1990

Related U.S. Application Data

[63] Continuation of Ser. No. 273,483, Nov. 21, 1988, Pat. No. 4,969,734.

[51] Int. Cl.5 ............................................. G03B 21/00
[52] U.S. Cl. ..................................... 353/122; 353/38; 353/102
[58] Field of Search ................. 353/38, 102, 121, 122, 353/65-67, 30-37; 350/330, 331 R, 345, 338, 334, 339 E

[56] References Cited

U.S. PATENT DOCUMENTS

| | | | |
|---|---|---|---|
| 3,051,041 | 8/1962 | Lehmann et al. | 353/60 |
| 3,768,899 | 10/1973 | Parra | 353/82 |
| 4,448,504 | 5/1984 | Altman | 353/36 |
| 4,536,014 | 8/1985 | Boutaleb et al. | 350/331 X |
| 4,613,207 | 9/1986 | Fergason | 350/331 |

*Primary Examiner*—Harry N. Haroian
*Attorney, Agent, or Firm*—Flehr, Hohbach, Test, Albritton & Herbert

[57] ABSTRACT

An image projection apparatus in which an image object plane contains a plurality of reflecting images and a light source and optical system projects a beam on each of said plurality of images. Spaced projection lenses are positioned to receive the light reflected from the images and direct the light on a projection surface with the plurality of reflected images in coregistration.

7 Claims, 3 Drawing Sheets

FIG.—1

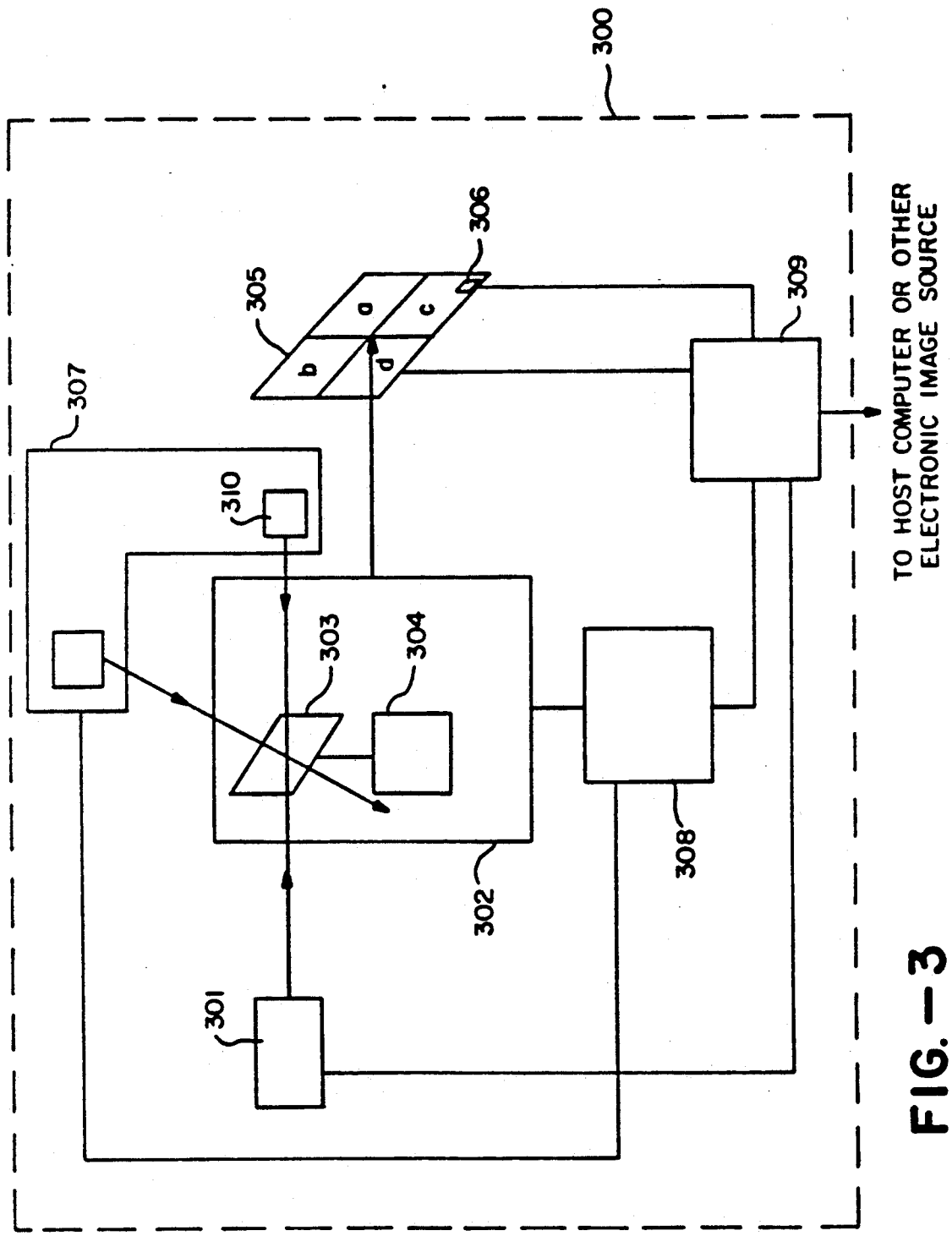
FIG.—3

APPARATUS AND METHOD OF FORMING AND PROJECTING HIGH PRECISION OPTICAL IMAGES

This is a continuation of application Ser. No. 273,483 filed on Nov. 21, 1988 now U.S. Pat. No. 4,969,734.

FIELD OF THE INVENTION

This invention relates to an apparatus and method of forming and projecting high precision optical images and more particularly to a method of forming the images by writing and editing with a selective heating source, advantageously a laser, on a writable, erasable, editable electronic slide and simultaneously or sequentially projecting the images, in registration, onto a receiving surface such as a projection screen or photosensitive material, in the former case for the purpose of displaying the projected image and in the latter case for the purpose of creating a hard copy of the projected image.

DISCUSSION OF THE PRIOR ART

Prior art relative to this invention relates firstly to methods for creating the slices or images to be projected and secondly to methods for projecting the slides so that certain subimages are in registration. Registration of the subimages is important for a variety of applications such as the creation of color images. The text Display Systems Engineering, edited by H. R. Luxenberg and R. L. Kuehn (1968) broadly summarizes the art prior to 1968. More recent art has been reviewed by Carbone (Large Screen Display Technology Survey, Richard M. Carbone, the MITRE Corporation, Bedford, Mass., Nov. 1982) and Todd (Lee T. Todd, Jr., Projection Display Devices, Society for Information Display, Seminar Lecture Notes, Vol. II, Paper 8.1, May 3, 1985).

Traditionally slices or images for projection have been created photographically by exposure of a light sensitive emulsion or by means of a scribing system in which a sharp point or stylus scratches the information into an opaque coating on a glass plate or film. The photographic method is not spontaneous and does not permit real-time update with new information or simultaneous writing and viewing. It also requires apparatus for film processing as well as writing. The scribing method permits real time viewing and updates but erasure of previously scribed information is impractical and the scribing rates are relatively slow.

Projection systems in which the cathodoluminescent target of a cathode ray tube serves as an electronic slide or image source overcome the disadvantages of the photographic and scribing approaches but are limited in image brightness and resolution. The projected image brightness is limited by saturation of the phosphor output as the CRT electron beam current is increased, by phosphor burn and faceplate failure due to overheating by excessive beam currents, and by practical limits on the physical size of the outputs used for image projection. Resolution is limited by the increase in focused beam spot size with increased beam current, resulting in a brightness-resolution tradeoff, and by the need for high bandwidth refresh circuits to refresh the projected images at 60 Hz or more in order to eliminate visible flicker. For example, a 4000×4000 picture element image refreshed at 60 Hz would require a 960 MHz data input. Even if such a high bandwidth data rate were practical, positioning of an electron beam to the positional accuracy required for such a display would require extremely expensive beam indexing built into the tube or extremely stable, i.e., expensive, analog electronics.

Strong magnetic shielding would be required to minimize the effect of terrestrial magnetism and local magnetic field variations on the electron beam position. Large area CRTs with image diagonals up to about 40 inches have been constructed, but their resolution is also limited by the aforementioned constraints on data rate and beam positional accuracy. Storage CRTs have been built which overcome the need for high bandwidth refresh, but storage CRTs have significantly lower lumen output than refreshed CRTs and are therefore of limited interest for projection systems and the direct view units must be used in rooms with subdued lighting.

The aforementioned constraints on brightness of systems incorporating CRTs with cathodoluminescent targets are overcome by a class of devices known as electronic light valves. In these electronic light valves, the reflection or transmission properties of a physical medium is spatially and temporally varied by electronic means. These electronic means may include electronic scanning of an electron or optical beam or gating of a voltage across the light valve medium by an electrode array. The light valve can then be used to control the flow of light from a light source to a receiving target. With appropriate optics to image the light valve on the receiving target, the spatial and temporal variations imposed by the electronic means on the light valve can be faithfully reproduced at the position of the receiving target. Commercial light valve systems have been introduced with capabilities to project images with information content up to about 2000 TV lines.

A new type of electronic light valve display based on a laser scanned smectic (LSS) liquid crystal and capable of storing and projecting images with significantly higher than 2000 TV line information content was described by Kahn (Frederic J. Kahn, U.S. Pat. No. 3,796,999, March 1974). Even images with lower than 2000 line information content have significantly improved definition due to the resolution of the LSS light valves. More recent development in LSS technology have been reviewed by Dewey (A. G. Dewey, Laser-Addressed Liquid Crystal Displays, Optical engineering, May-June 1984, Vol. 23, pp. 230-240).

LSS light valves consist of a thin layer of smectic liquid crystal sandwiched between two substrates. The image is written thermally by scanning a focused laser beam across the light valve. The entire image can be erased in a small fraction of a second by applying a voltage across the smectic layer. The writing beam can be transformed into an erasing beam for local editing of the written image by applying a somewhat lower voltage than required for erase of the entire image. When such a voltage is applied only those regions which are reheated by the laser beam will be erased. Advantages of these thermal smectic light valves in addition to the high resolution, erase, and local editing features are 1) the image is stored in the liquid crystal until electrically erased, thus no image refresh is required, 2) the optical properties of the image are relatively wavelength independent; thus these light valves can be used to control light from the near uv through the ir and any part of the spectrum in between, 3) there is minimal absorption of light by the liquid crystal and associated optical elements, thus this light valve can be used to control very high intensity light sources with high optical efficiency, 4) laser absorbers can be constructed to match a wide range of laser wavelengths thereby enabling use of a wide variety of writing lasers including semiconductor lasers which are relatively economical, compact, and reliable.

Despite the significant advantages cited above, commercial application of the LSS light valves has been limited by the complex and expensive scanning mechanisms required for creating very high information content images, the inability to scan precisely in a repeatable fashion, the unavailability of a method practical for creating a high resolution full color image without using multiple scanners, the unavailability of a scan system for high resolution full color images with random access as well as raster scan capabilities, the inability to display bright full color images with moderate power light sources, and the inability to implement a practical on-screen cursor. Thus a display and imaging system capable of creating precision, very high information content, full color, random scan images with a relatively simple writing system and a relatively low power projection source is desired. An additional desirable feature is a cursor. Furthermore the same precision image writing and projection capabilities desired for creation of full color images are required for producing and registering images on photosensitive hard copy materials.

SUMMARY OF THE INVENTION

This invention relates to a method of forming and projecting high precision optical images and more particularly, to a method of forming the images by writing and editing with a selective heating source, advantageously a laser, on a writable, erasable, editable electronic slide and simultaneously or sequentially projecting the images, in registration, onto a receiving surface such as a projection screen or photosensitive material. The present apparatus and method provides for efficient use of the projection light source and excellent spatial fidelity of the projected image relative to the original image, the original image being electronically entered into the image forming and projection system.

The preferred method and apparatus for forming the image provides for precision scanning of a focused laser beam across a light sensitive layer which stores a pattern of information determined by the trajectory of the laser beam. The position of the beam is varied with a single scan system. This position of the beam on the entire light sensitive layer is controlled by a servo system which corrects the laser beam trajectory by comparing the desired position signal with actual position to derive an error signal.

The series of trajectories so created are stored in a liquid crystal cell which is patterned into one or more subcells each one of which is independently writable, erasable, and editable by means of the scanned laser beam and appropriate electrical control voltages.

Different cells which are operable in either transmission or reflection can be fabricated. A reflection cell structure is preferred for color display and hard copy printing applications because reflective cells can withstand the required intense illumination levels.

The method for creating a color projection display consists of assigning a different primary projection color, e.g., red, green, blue for an additive color system with broad spectral coverage, to each of several subcells, and where desired, to use an additional subcell for an independent cursor or overlay. These subcells are coprojected in registration to achieve a full color image with cursor or overlay. One or more detectors are provided at the edge of the receiving surface for the projected image in order to facilitate satisfactory registration of the projected image with that surface.

The preferred method for projecting the full color images together with an overlay plane which can be used, for example, for implementing a cursor consists of taking the output from a single lamp and splitting it into two white channels. One white channel is subdivided into three color beams (red, green, and blue). These three color beams together with the remaining white beam are preferably imaged by means of a single relay condenser onto the liquid crystal cell so that each beam illuminates primarily only one subcell. The relay condenser forms an image of the lamp on the aperture of each of four projection lenses, one for each beam. The projection lenses are positioned so as to project the subimages in registration onto a single receiving surface so as to result in a full-color image with cursor/overlay on that surface. This projection method is highly efficient in collecting light and transferring it to the receiving surface which for display applications can be a rear projection screen.

Electronic means are provided to correct for residual distortion and positional differences in the images written on the subcells so as to provide image registration to within a fraction of the minimum linewidth which can be written and projected. The method for distortion correction involves use of a look up table with table entries keyed to sections of the image.

It is a general object of the present invention to provide an improved apparatus and method for forming and projecting optical images.

It is another object of the present invention to provide an apparatus for forming and projecting optical images which are formed electronically on light valves in general and smectic liquid crystal light valves in particular.

It is a further object of the present invention to provide an apparatus and method for forming and projection a plurality of separate images in registration.

It is another object of the present invention to provide an apparatus and method for forming images on a liquid crystal cell and for projecting said images in registration by reflection from the cell.

The foregoing and other objects of the invention are achieved by a system in which stored images are projected by reflection from an image source such as a liquid crystal.

The foregoing and other objects of the invention will be more clearly understood from the following description when read in conjunction with the accompanying drawings of which:

FIG. 3 is a schematic diagram showing an electronic imaging system in accordance with the invention.

DETAILED DESCRIPTION OF THE DRAWINGS

The present invention relates to a method for electronically creating high precision optical images and, more particularly, to a method for creating images which have precisely controlled geometries and which can be uniformly registered with each other by coprojection onto a receiving surface such as a projection screen or photosensitive material. A specific embodiment of this invention is a high information content, large area display apparatus for full-color images. Another is an apparatus for printing full-color hard copy.

Figure 1:
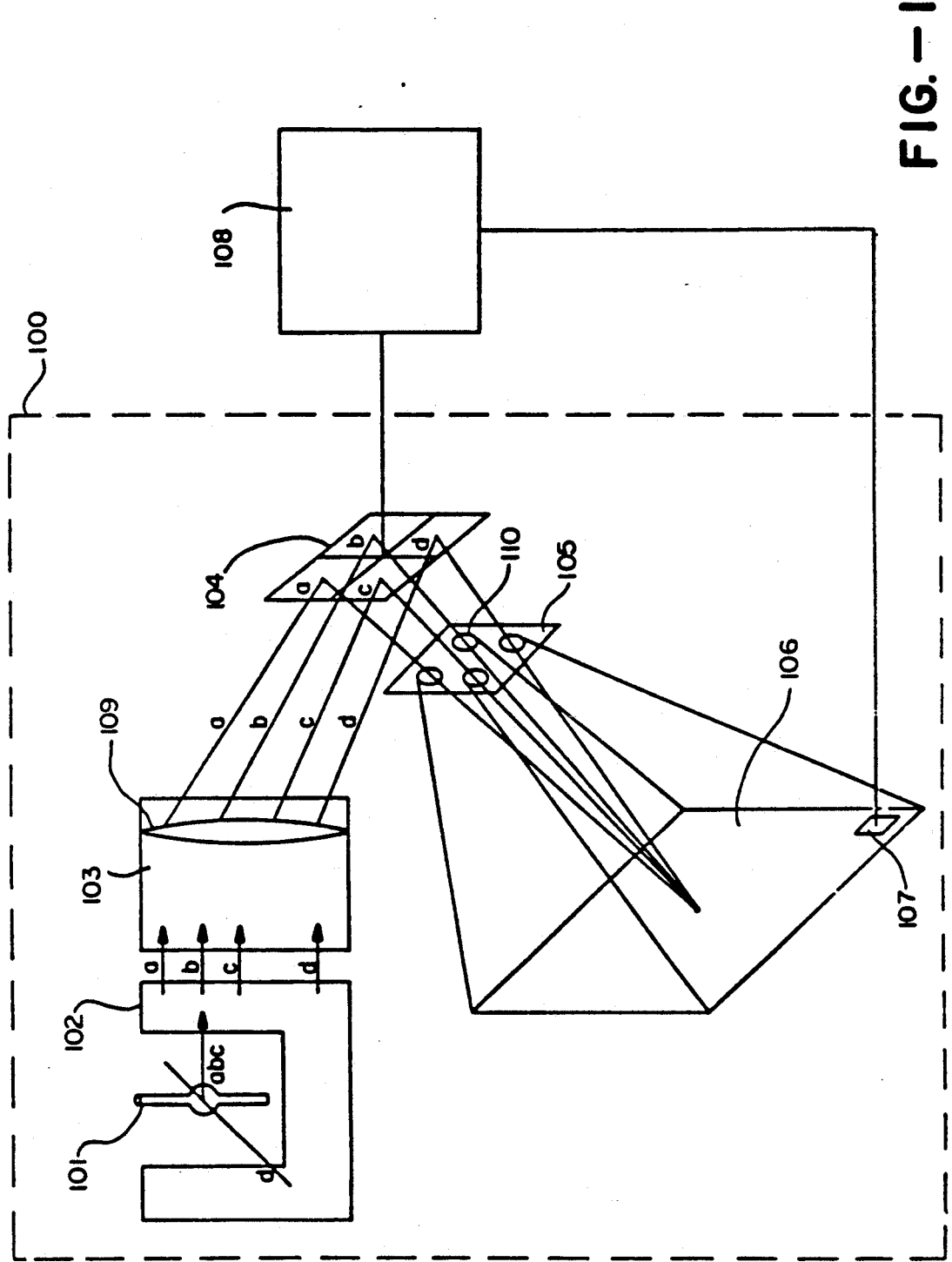
FIG. 1 is a schematic view showing primarily a reflection projection system in accordance with the invention.
Figure 2:
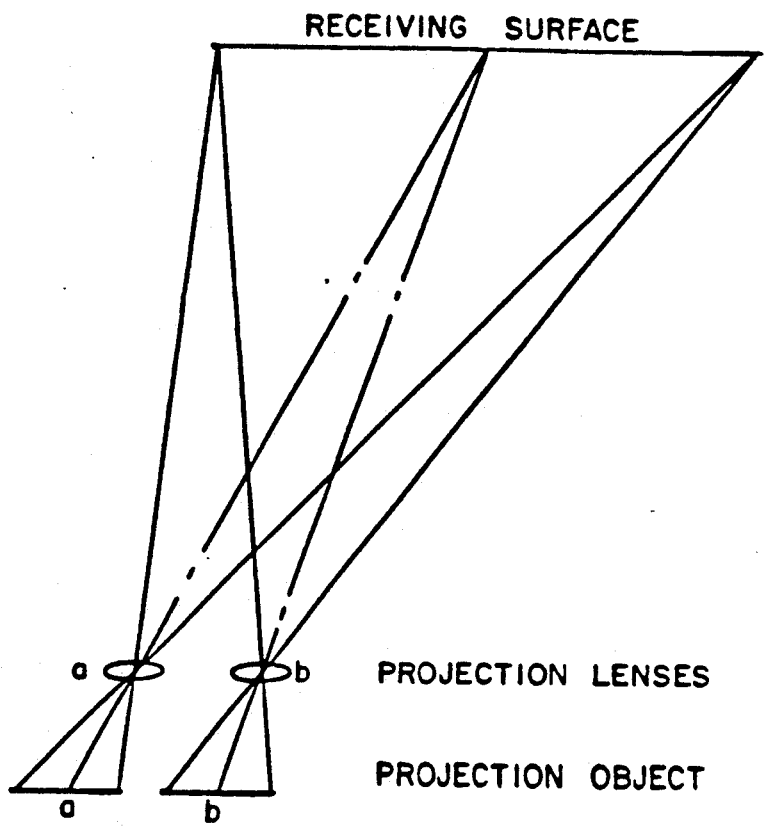
FIG. 2 shows the positioning of the projection lense.

FIG. 1 shows a projection system 100 employed in the present invention. A source of radiation energy or light 101, illustratively a 1000 watt Xenon arc lamp, emits light which is collected by an optical system 102 and directed onto reflective object 104 in such manner that each beam illuminates primarily one particular area or section of object 104. Such an illumination system designed for transmission projection of multiple slide images is described on pp. 197–199 of Luxenberg and Kuehn. In the present invention the light reflected from each area illuminates the aperture of one particular lens of lens array 105, illustratively consisting of multielement lenses with achromatized designs. Lens array 105 images the reflective object 104, illustratively a pattern with spatially varying reflectivity, on the receiving surface 106, illustratively a rear projection screen, in such manner that the received images of each section of object 105 are precisely registered with each other on surface 106. The illumination axes of the lenses in array 105 are slightly tilted relative to each other so that they will converge at the center of surface 106. The lens positions are determined by drawing the rays connecting the extrema of the subimages and the extrema of the receiving surface and locating the lenses at the intersection of the rays. These locations provide for coregistration of the images on the receiving surface as shown in FIG. 2. Image position sensor 107, located on the receiving surface or at an optically equivalent position, is used to detect temporal shifts in position of the received image. Illustratively a registration pattern may be projected on sensor 107, and the signal from sensor 107 processed by processor 108 to determine the position of that registration pattern and hence to determine the position of the image which has a known spatial relationship to the registration pattern. In a preferred embodiment, keystone distortion can be avoided by making the planes of object 104, array 105 and surface 106 parallel to each other. Alternatively, keystoning can be electronically corrected by predistorting the image on reflective object 104; and resulting focus shifts, when 104, 105, and 106 are not coplanar, can be corrected by satisfying the Scheimpflug condition.

Distortions in the projected image contributed by individual lenses in array 105 and by residual misalignments and imperfections in the projection system, can be similarly corrected by predistorting the image found on reflective object 104. For this purpose processor 108 includes electronic means for correcting distortions of the projected image, illustratively by means of a look-up table in which corrections due to the computed distortion of the writing system 300, FIG. 3, the computed distortion of the projection lenses, and the residual distortion determined experimentally after the computed distortions have been corrected for, are treated additively to compute the entries in the look-up table. Illustratively, the size of the look-up table and hence the memory required to store it may be minimized by entering values only for selected points or the projected image and using interpolation algorithms to determine the values at intermediate points. Processor 108 also includes electronic means for decoding the position shifts transmitted by image position sensor 107 which is physically linked to receiving surface 106 and for correcting the position of the reflective images on 104 in such manner that they will project with the correct positions relative to receiving surface 106 and sensor 107. Illustratively, sensor 107 may consist of one or more patterned masks positioned in front of one or more photodetectors. Processor 108 includes controller 309 and servo 308 shown in FIG. 3.

The reflective object 104 described above may be a static image, e.g., a pattern of aluminum or chrome on a transparent substrate such as glass. Such an object due to its minimal light absorption in both the reflecting and transmitting regions will be suitable for projection of very intense illumination levels onto the receiving surface. The reflectivity of the metallic reflecting regions may be enhanced by means of well known thin film dielectric coatings. Similarly the transmittance of the nonreflecting regions and hence the resultant contrast of the mask may also be enhanced by thin film dielectric coatings.

The reflective object may be an image which can be written and erased by electronic means, i.e., an electronic light valve. Preferably, the reflective object may be a laser scanned smectic (LSS) liquid crystal light valve. By patterning the conducting electrodes of such a device it is possible to selectively apply higher electric fields to one or more independently selected sections, e.g., 104a, 104b, 104c or 104d, than to the remaining unselected sections of the same device and thereby to independently erase the individual selected sections or to edit laser-selected portions of the individual selected sections.

Use of a single condenser 109 in the directing optical system 103 to illuminate two or more of the projection lenses in array 105 is advantageous in enabling faster (larger aperture) projection lenses to be employed and higher image-to-object magnification ratios to be achieved than would be the case if each projection lens had its own illuminating condenser. Without a single condenser it would be necessary to use projection lenses with very small apertures, which would result in unacceptably low image brightness, or impractically large off-normal angles of incidence on object 104. Therefore a multiple imaging reflective system is impractical. The projection lenses 110 in array 105 are preferably multielement lenses in which the optical power is concentrated primarily in the inner elements and achromatization is concentrated primarily in the outer elements in order to provide individual lenses with lengths from front-to-rear surface less than one half their total focal length, thereby providing a compact projection system design with a relatively small off-normal projection angle, high resolution and low projection lens distortion. The preferred projection system include a single condenser 109 in the directing optical system 103, a collecting optical system 102 which splits the light into 4 beams with predominately red, green, blue, and white wavelengths respectively, a reflective object 104 with four subobjects arranged with Manhattan geometry as in FIG. 1, and a rectangular array of 4 lenses 105 to project the subimages in registration onto receiving surface 107.

The coregistered red, green, and blue projected images provide a full color projected image on surfaced 107 while coprojection of the white image enables realization of an independent cursor or overlay plane superposed on that full color image. Furthermore the derivation of the red, green, and blue beams from a single white beam by use of dichroic filters in collecting optical system 102 results in a relatively bright projected image on surface 107. Alternatively it may be desirable to add color or neutral density filters to modify the color or intensity of the white overlay channel or to add a blue filter to the white channel and use it to enhance the brightness of the blue part of the full color images.

In one embodiment image position sensor 107 may include a patterned mask and a photodetector positioned such that a portion of the image projected on receiving surface 106 is in focus on the patterned mask and is transmitted through that mask before reaching the photodetector. If the mask pattern includes at least two regions with differing transmissions and a sharp (edge) boundary between them, stepwise or continuous movement across that boundary of a projected image also containing at least one edge will result in a change in the output of the photodetector enabling unique determination of the writing system coordinates positioning the projected edge at the position of the mask edge. It may be advantageous to use more than one image position sensor 107, for example, to determine rotational as well as translational shifts in image position and to correct for the same by means of processor 108.

In another example of a projection system embodying the invention, lens array 105 includes only a single lens and only a single image at a time is projected onto receiving surface 107. Image position sensor 107 in combination with processor 108 can serve to maintain positional registration between the projected image and the receiving surface.

The combination of image position sensor 107 and processor 108 will also be useful for maintaining image-to-receiving surface 106 registration in projection systems with transmissive objects and in which the light source 101 and projection lenses 105 are located on opposite sides of the object 104.

FIG. 3 shows a writing system employed in the present invention. A beam of light from writing source 301 is focused and scanned across object 305 by scanning system 302. Position sensor 307 measures changes in position of the scanning mirrors, illustratively mirror 303, in scanning system 302 and provides an output signal containing the information on these changes to servo 308. Servo 308 provides the electronic drive signal for scanning system 302 in such a manner as to result in minimal differences between the desired mirror positions provided by controller 309 and the actual mirror positions determined by mirror position sensor 307 in combination with servo 308. A beam position sensor 306 is located at the surface of object 305 or at an optically equivalent position. Object 305 receives the focused spatially scanned laser beam and sensor 306 provides an absolute reference relating the position of the laser beam on object 305 and sensor 306 to the scanning mirror positions. Controller 309 electronically corrects the desired mirror position signal to account for temporal position shifts sensed by beam position sensor 306. Illustratively, sensor 306 may consist of one or more patterned mask and photodetector pairs analogous to sensor 107 described above. In one embodiment, patterning of the masks to include at least one edge or boundary separating two areas of different transmission will enable detection of the writing beam position as it moves across that edge. Thus, beam position sensor 306 may illustratively be similar in structure and operation to image position sensor 107 except that it is the scanned laser beam itself which is detected rather than an edge contained in a projected image.

Writing source 301 may illustratively include a semiconductor laser which emits light with a wavelength of about 800 nm, prisms and lenses to circularize, enlarge, and collimate the laser beam, and an electrical circuit to vary the intensity of the beam in a timewise fashion. Scanning system 302, in addition to including at least one mirror 303 to deflect the laser beam, may illustratively include a galvanometer 304 to drive the laser beam deflecting mirror and a scan lens, illustratively an f-theta lens, to convert angular deflections of the laser beam into spatial deflections of a focused laser beam spot along the surface of object 305. Mirror position sensor 307 may include light sources and gratings 310 and detectors with grating reticles 311 enabling determination of the positions and the directions of movement of each scanning mirror. A particular embodiment of mirror position sensor 307 is described in companion application entitled Apparatus for Detecting Position.

Controller 309 illustratively may include a graphics processor with means to receive a variety of graphics inputs from external electronic image sources, a vector generator to provide the desired scan position information signal for the servo 308, control signals for modulating the write source 301, and electrical signals for erasing and editing of the various sections of object 305 when that object is an electronic light valve.

Object 305 may be one of many different devices. For example, it may be a previously patterned reflective or transmissive object to be scanned by the laser beam, illustratively for the purpose of inputting data related to the patterns recorded on said object into an information processing or storage system. Variations in intensity of the scanned laser beam after reflection or transmission from the object may be sensed by one or more appropriately positioned photodetectors. Object 305 may be a recording material sensitive to the wavelength of the scanned laser beam, illustratively infrared sensitive paper or film. Object 305 may be an electronic light valve illustratively including a photoconductive layer sensitive to the wavelength of the scanned laser beam. Object 305 may be a transmissive mode LSS light valve, illustratively including a dye absorbing at the scanned laser wavelength and mixed into the liquid crystal for the purpose of absorbing heat transported by the scanned laser beam directly into the liquid crystal layer.

Object 305 may be a reflective mode LSS light valve. Preferably the object 305 consists of 4 subimages arranged in a Manhattan geometry on a single object as shown in FIG. 3 so as to enable scanning of the entire image with a single scanner and to minimize variations in the relative positions of these subimages dues to mechanical and thermal disturbances, thereby facilitating precise coregistration of the coprojected images.

Figure 4:
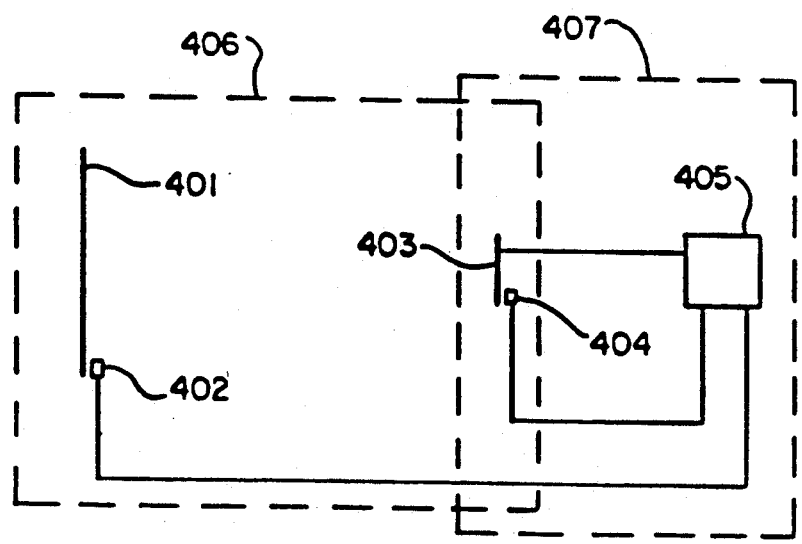
FIG. 4 is a schematic diagram showing the combined imaging and projection system.

FIG. 4 shows a combined writing and projection system consisting of a projection system 406 and a writing system 407 which include a common object 403, a beam position sensor 404 physically linked to object 403, a receiving surface 401, an image edge detector 402 physically linked to receiving surface 401, and a controller 405. Controller 405 receives the position signals from sensors 402 and 404 and corrects the position of the object image on object 403 so as to result in accurate registration of the projected image with respect to receiving surface 401 in keeping with the preceding discussions of projection system 100 and writing system 300.

Thus there is provided a system for forming and projecting and displaying or recording high precision optical images.

What is claimed is:

1. A projection apparatus including
    a light source,
    an image object plane containing at least two spaced images,
    optical means disposed to receive light from said source and form at least two beams and directing one of said beams on each of said images,
    at least two spaced multielement projection lenses in which the power is concentrated primarily on the inner elements and achromatization is concentrated primarily in the outer elements to provide lenses with front to rear surface lengths less than half the focal length to provide a compact design with relatively small off-axis angle, high resolution and low distortion, said projection lenses positioned to receive light from said images and direct the light from said images onto a receiving plane so that the images are in coregistration.

2. An apparatus for projecting a given image on a projection plane, comprising
    means for providing a beam of light;
    means optically coupled to said beam for modulating the latter in a way that depends upon the manner in which the modulating means is addressed;
    means for addressing said modulating means;
    means for projecting the modulated beam onto said projection plane so as to form said given image;
    means at said addressed modulating means for sensing any differences between the way in which the modulating means is intended to be addressed and the way in which it is actually addressed; and
    means responsive to said differences, if any, for controlling said addressing means so as to substantially eliminate said difference.

3. An apparatus according to claim 2 wherein said addressing means includes means for scanning one surface of said modulating means with an optical beam, wherein said sensing means senses the position of said scanned beam on said one surface, and wherein said controlling means includes means for changing the way in which said optical beam scans said one surface in order to substantially eliminate said differences, if any.

4. An apparatus according to claim 2 including
    means at said projection plane for sensing the position of said given image on the projection plane; and
    means responsive to the portion of said given image on said projection plane as sensed by said last-mentioned sensing means for controlling said addressing means in a way which insures that said given image is at the intended location on said projection plane.

5. A method of projecting a given image on a projection plane, comprising the steps of
    providing a beam of light;
    modulating the beam of light in a way which depends upon the manner in which the modulating means is addressed;
    addressing said modulating means;
    projecting the modulated beam onto said projection plane so as to form said given image;
    sensing at said addressed modulating means any differences between the way in which the modulating means is intended to be addressed and the way in which it is actually addressed; and
    in response to said differences, if any, controlling said addressing means so as to substantially eliminate said difference.

6. A method according to claim 5 including the steps of
    sensing at said projection plane the position of said given image on the projection plane; and
    in response to the position of said given image on said projection plane, controlling said addressing means in a way which insures that said given image is at the intended location on said projection plane.

7. An apparatus for projecting an image on a projection plane including
    an image object plane comprising a light valve,
    means forming at least one image on said light valve,
    a light source,
    optical means for receiving light from said light source and forming at least one beam and directing said beam to said light valve,
    at least one projection lens positioned to receive light from said light valve image and direct the light to said projection plane,
    means at said light valve for sensing the position of the image on the light valve, and
    means for controlling the image forming means for positioning the image on said light valve in response to the position sensed by the position sensing means.

* * * * *